United States Patent [19]

Suzuoki

[11] Patent Number: 5,675,667
[45] Date of Patent: Oct. 7, 1997

[54] PICTURE COMPRESSION APPARATUS, PICTURE REPRODUCING APPARATUS AND PICTURE DRAWING APPARATUS

[75] Inventor: Masakazu Suzuoki, Tokyo, Japan

[73] Assignee: Sony Corporation, Tokyo, Japan

[21] Appl. No.: 642,796

[22] Filed: May 3, 1996

Related U.S. Application Data

[63] Continuation of Ser. No. 305,073, Sep. 13, 1994, abandoned.

[30] Foreign Application Priority Data

Sep. 14, 1993 [JP] Japan .................................. 5-229307

[51] Int. Cl.⁶ .................................................. G06K 9/36
[52] U.S. Cl. ........................ 382/232; 382/251; 382/233
[58] Field of Search ................................. 382/232, 233, 382/235, 248, 250, 251, 252; 358/426, 405; 348/404, 405

[56] References Cited

U.S. PATENT DOCUMENTS

| | | | |
|---|---|---|---|
| 4,624,006 | 11/1986 | Rempfer et al. | 377/69 |
| 5,216,516 | 6/1993 | Tanaka et al. | 358/426 |
| 5,237,431 | 8/1993 | Imoto | 358/445 |
| 5,357,584 | 10/1994 | Yamaoka | 382/56 |

FOREIGN PATENT DOCUMENTS 0 510 933  10/1992  European Pat. Off. .

OTHER PUBLICATIONS

Patent Abstracts of Japan, vol. 14, No. 24B (E-933), 28 May 1990 & JP-A-02 070126 (Toshiba) 9 Mar. 1990, Abstract.
ICC '93, vol. 1, 23 May 1993 Geneva, pp. 537-541, a.c. Hadenfeldt et al., "Compression of Colour-Mapped Images", Abstract, paragraph 3-4.

Primary Examiner—Yon J. Couso
Attorney, Agent, or Firm—William S. Frommer; Alvin Sinderbrand

[57] ABSTRACT

Digital image data are compressed in a first iteration of orthogonally transforming a predetermined amount of the original image data, such as index data for a splite pattern, and quantizing the transform coefficients. Then the quantized data are locally decoded, and the decoded data are compared with the original image data. If there are no errors, that is, the decoded data matches the original image data, the quantized data are variable length encoded to form compressed data for output, such as recording on a CD-ROM recording medium. If there are errors, then a next iteration is performed, in which the original image data are bit shifted and then orthogonally transformed, the transform coefficients are quantized, and the quantized data are locally decoded. As before, the decoded data are compared with the original image data. If there are no errors, the quantized data are variable length encoded to form compressed data for output. If there are errors, then the original image data are further bit shifted in a next iteration, and the above described processing is repeated until there are no errors. The recorded compressed data are reproduced, variable length decoded, dequantized, inverse orthogonally transformed, inverse bit shifted, and used as picture data for display on a television.

17 Claims, 5 Drawing Sheets

| 4096 | 4096 | 4096 | 4096 | 4096 | 4096 | 4096 | 4096 |
|------|------|------|------|------|------|------|------|
| 5681 | 4816 | 3218 | 1130 | -1130 | -3218 | -4816 | -5681 |
| 5352 | 2217 | -2217 | -5352 | -5352 | -2217 | 2217 | 5352 |
| 4816 | -1130 | -5681 | -3218 | 3218 | 5681 | 1130 | -4816 |
| 4096 | -4096 | -4096 | 4096 | 4096 | -4096 | -4096 | 4096 |
| 3218 | -5681 | 1130 | 4816 | -4816 | -1130 | 5681 | -3218 |
| 3217 | -5352 | 5352 | -2217 | -2217 | 5352 | -5352 | 2217 |
| 1130 | -3218 | 4816 | -5681 | 5681 | -4816 | 3218 | -1130 |

FIG.3

| 8 | 16 | 19 | 22 | 26 | 27 | 29 | 34 |
|---|----|----|----|----|----|----|----|
| 16 | 16 | 22 | 24 | 27 | 29 | 34 | 37 |
| 19 | 22 | 26 | 27 | 29 | 34 | 34 | 38 |
| 22 | 22 | 26 | 27 | 29 | 34 | 37 | 40 |
| 22 | 26 | 27 | 29 | 32 | 35 | 40 | 48 |
| 26 | 27 | 29 | 32 | 35 | 40 | 48 | 58 |
| 26 | 27 | 29 | 34 | 38 | 46 | 56 | 69 |
| 27 | 29 | 35 | 38 | 46 | 56 | 69 | 83 |

FIG.4

PICTURE COMPRESSION APPARATUS, PICTURE REPRODUCING APPARATUS AND PICTURE DRAWING APPARATUS

This application is a continuation of application Ser. No. 08/305,073, filed Sep. 13, 1994 now abandoned.

BACKGROUND OF THE INVENTION

The present invention relates to picture compression apparatus, a picture reproducing apparatus and a picture drawing apparatus, and, more particularly, is directed to compressed picture data obtained by dividing original picture data into blocks each composed of a pre-set number of pixels and processed by transform coding, quantization and encoding on a block-by-block basis.

The following five applications are related to the present application, and have a common assignee with the present application: JP Patent Application 04310272, filed on Nov. 19, 1992, and corresponding published EP application no. 0598613; JP Patent Application 04336593, filed on Nov. 24, 1992, and corresponding published EP application no. 0599579; JP Patent Application 06018228, filed on Feb. 15, 1994, and corresponding U.S. application Ser. No. 08/226,843 now pending; JP Patent Application 05190764, filed on Jul. 2, 1993, and corresponding U.S. application Ser. No. 08/267,678 now pending; and JP Patent Application 05190763, filed on Jul. 2, 1993, and corresponding U.S. application Ser. No. 08/269,076 now pending.

In certain conventional television game apparatus, two-dimensional picture data are mapped to a rectangular picture area (referred to herein as a "splite", sometimes also called a "sprite"). The splites are combined like the tiles of a mosaic on a display screen to produce an image. In such systems, images can only be produced as combinations of two-dimensional images produced from splite patterns which have been stored in advance.

The system of forming or drawing a picture using such splite pattern is referred to as a pseudo color system, and typically involves storing plural splite patterns in a memory. The conventional television game equipment requires a large memory to store the splite patterns which are reproduced upon starting a video game.

Each splite pattern comprises a matrix of pixels arranged in an 8 by 8 array. Each pixel has a color value which is represented by index data, for example, an 8 bit word, as shown in FIG. 1A. The index data is used as an address for a color lookup table (CLUT). Thus, each splite pattern is formed as an 8×8 array of index data.

As shown in FIG. 1B, the CLUT comprises 256 entries, corresponding to the address space of the 8 bit index data, with each entry representing three color values, such as data for red (R), green (G) and blue (B). Use of the index data for each splite pattern, instead of the three color values, reduces the number of bits needed to represent the pixels in a splite pattern. Use of the CLUT reduces the number of memory accesses needed when drawing a picture, so that a drawing operation may be performed at higher speed.

Typically, the index data of the splite patterns are compressed by a discrete cosine transform circuit, a quantization circuit and a variable length encoding circuit for storage in the memory. This renders it possible to store a large number of splite patterns without providing a memory having a large storage capacity.

When drawing a picture, such as when the television game is begun, the compressed splite patterns are read from, e.g., a disk into the memory, expanded in accordance with a software algorithm programmed in the television game equipment, and supplied to a color lookup table as addresses. Picture data corresponding to the pixels in the splite pattern are read out from the color lookup table and supplied to a video RAM. Picture data having a raster size is formed by plural splite patterns and routed to a television receiver to permit progress of the television game. As shown in FIG. 1C, a picture corresponding to the thus processed splite pattern is displayed by the television receiver.

The software algorithms for compressing and expanding the splite patterns are typically constrained by the memory size. This constraint usually limits the performance which can be achieved.

When the index data is compressed using the conventional technique of orthogonal transformation, quantization and variable length encoding, and then expanded, data corruption tends to occur in the lower bits of the index data. Since picture data of analogous color hue are not necessarily stored in adjacent entries of the color lookup table, the data corruption results in a difference in color hue between the original picture and the decoded (compressed and expanded). This problem of a difference in color hue is not present in a so-called direct color system in which picture data are directly compression coded, stored in a memory and expanded, even if the original picture data are slightly corrupted during the compression and expansion processing.

The larger the number of splite patterns which can be stored in the memory, the more variegated is the picture represented by the splite patterns. However, it is difficult to cost-effectively provide television game equipment for household use with a memory which is of sufficient capacity to hold a large number of the splite patterns.

OBJECTS AND SUMMARY OF THE INVENTION

Therefore, an object of the present invention is to provide an apparatus which avoids the aforementioned disadvantages of the prior art.

It is another object of the present invention to provide a picture compression apparatus, a picture reproducing apparatus and a picture drawing apparatus, in which the constraints on software algorithms for compressing and expanding picture data may be reduced.

It is a further object of the present invention to provide a picture compression apparatus, a picture reproducing apparatus and a picture drawing apparatus, in which, although original picture data is compressed, the expanded picture data exhibits the same color hue as the original picture data even with the use of the pseudo color system employing the color lookup table.

It is another object of the present invention to provide a picture compression apparatus, a picture reproducing apparatus and a picture drawing apparatus, which does not require excessive memory area during reproduction of the picture data.

In accordance with an aspect of this invention, a picture compression apparatus compares original picture data with decoded picture data to produce a control signal, and shifts the original picture data in accordance with the control signal. The shifted original picture data is orthogonally transformed to produce coefficient data which is quantized, and then decoded to produced the decoded picture data.

The original picture data may be index data for a splite pattern, the index data referencing a color lookup table.

In accordance with another aspect of the present invention, a picture reproducing apparatus dequantizes quantized data to produce recovered coefficient data, inverse orthogonally transforms the recovered coefficient data to produce shifted picture data, and inverse shifts the shifted picture data as a function of a control signal to produce decoded picture data.

The quantized data supplied to the picture reproducing apparatus may be index data for a splite pattern which references a color lookup table and was compressed as described above.

In still another aspect of the present invention, a picture drawing apparatus reproduces compressed picture data and shift data from a recording medium, decodes the compressed picture data to produce decoded picture data, and forms the decoded picture data into picture data for display by display means. The decoding includes dequantizing the compressed data to produce recovered coefficient data, inverse orthogonally transforming the recovered coefficient data to produce shifted picture data, and inverse shifting the shifted picture data as a function of the shift data to produce the decoded picture data.

The above, and other objects, features and advantages of the present invention will be apparent from the following detailed description of the preferred embodiments of the present invention when read in conjunction with the accompanying drawings in which corresponding parts are identified by the same reference numeral.

BRIEF DESCRIPTION OF THE DRAWINGS

FIG. 3 shows an orthogonal transform matrix used by the picture compression apparatus shown in FIG. 2;

FIG. 4 shows a quantization table used by the picture compression apparatus shown in FIG. 2;

DETAILED DESCRIPTION OF THE PREFERRED EMBODIMENTS

The present invention may be employed in, for example, picture data recording and/or reproducing apparatus, digital video tape recorders, television telephone system, a teleconferencing system or equipment of a telecasting station.

The present invention compresses digital image data in a first iteration of orthogonally transforming a predetermined amount of the original image data, such as index data for a splite pattern, and quantizing the transform coefficients. Then the quantized data are locally decoded, and the decoded data are compared with the original image data. If there are no errors, that is, the decoded data matches the original image data, the quantized data are variable length encoded to form compressed data for output, such as recording on a CD-ROM recording medium.

If there are errors, then a next iteration is performed, in which the original image data are bit shifted and then orthogonally transformed, the transform coefficients are quantized, and the quantized data are locally decoded. As before, the decoded data are compared with the original image data. If there are no errors, the quantized data are variable length encoded to form compressed data for output. If there are errors, then the original image data are further bit shifted in a next iteration, and the above described processing is repeated until there are no errors.

Thus, by adjusting the amount of bit shifting of the index data, data may be compressed and then recovered without errors due to compression. Such error-free compression is referred to herein as reversible data compression.

A shorter the length of quantized input picture data, that is, a smaller amount of bit shifting, results in more efficient data compression. When, during local decoding, the picture data is rounded before shifting, the amount of bit shifting required in the encoder may be reduced, for example, by one bit, thus contributing to improved compression efficiency.

With reversible data compression as achieved by the present invention, the decompressed picture displayed on a television receiver has the same color hue as the original picture.

The present invention reduces the constraints on software algorithms for compressing and expanding the splite patterns since decoding is performed by hardware.

A picture compression apparatus according to a preferred embodiment of the present invention will now be explained.

Figures 1A, 1B, 1C:
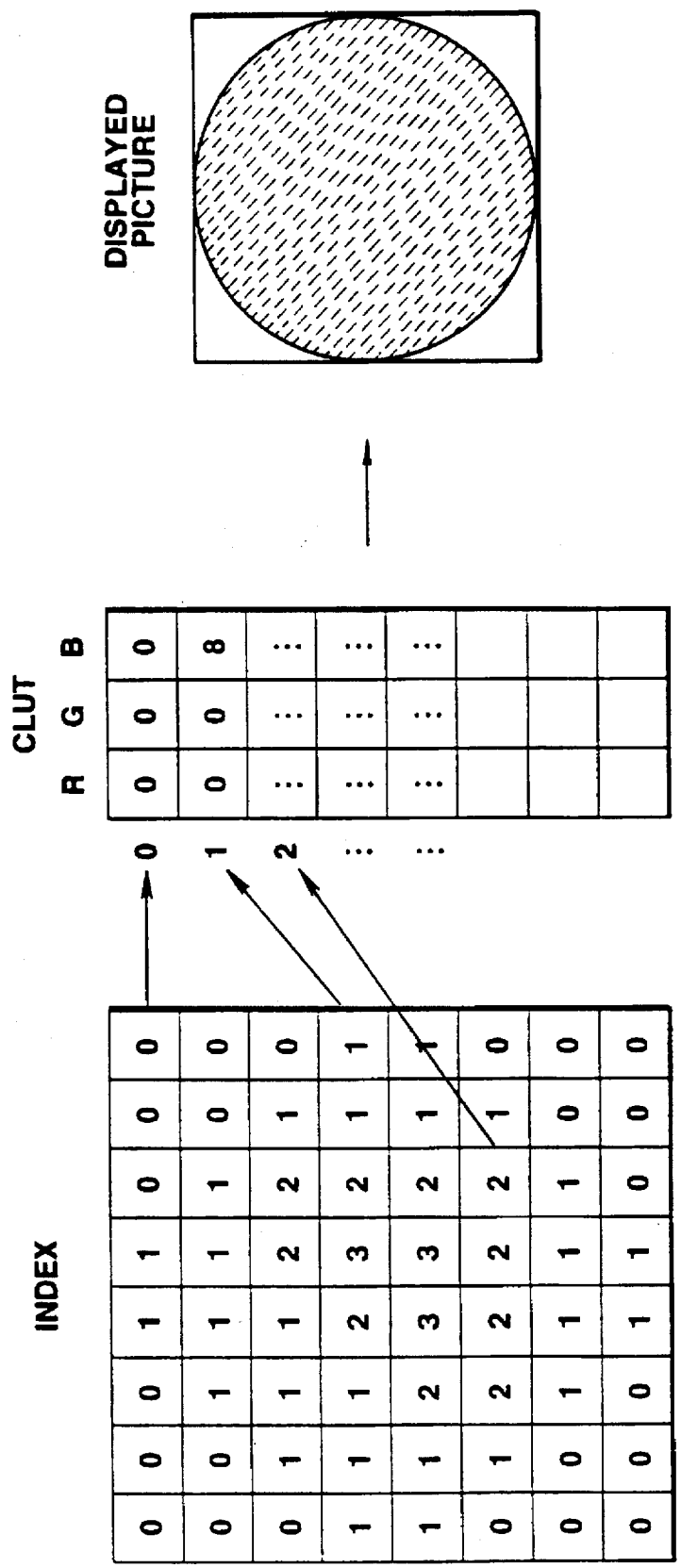
FIG. 1A illustrates index data for a splite pattern.
FIG. 1B illustrates a color lookup table referenced by the index data shown in FIG. 1A.
FIG. 1C illustrates a picture corresponding to the splite pattern shown in FIG. 1A.
Figure 2:
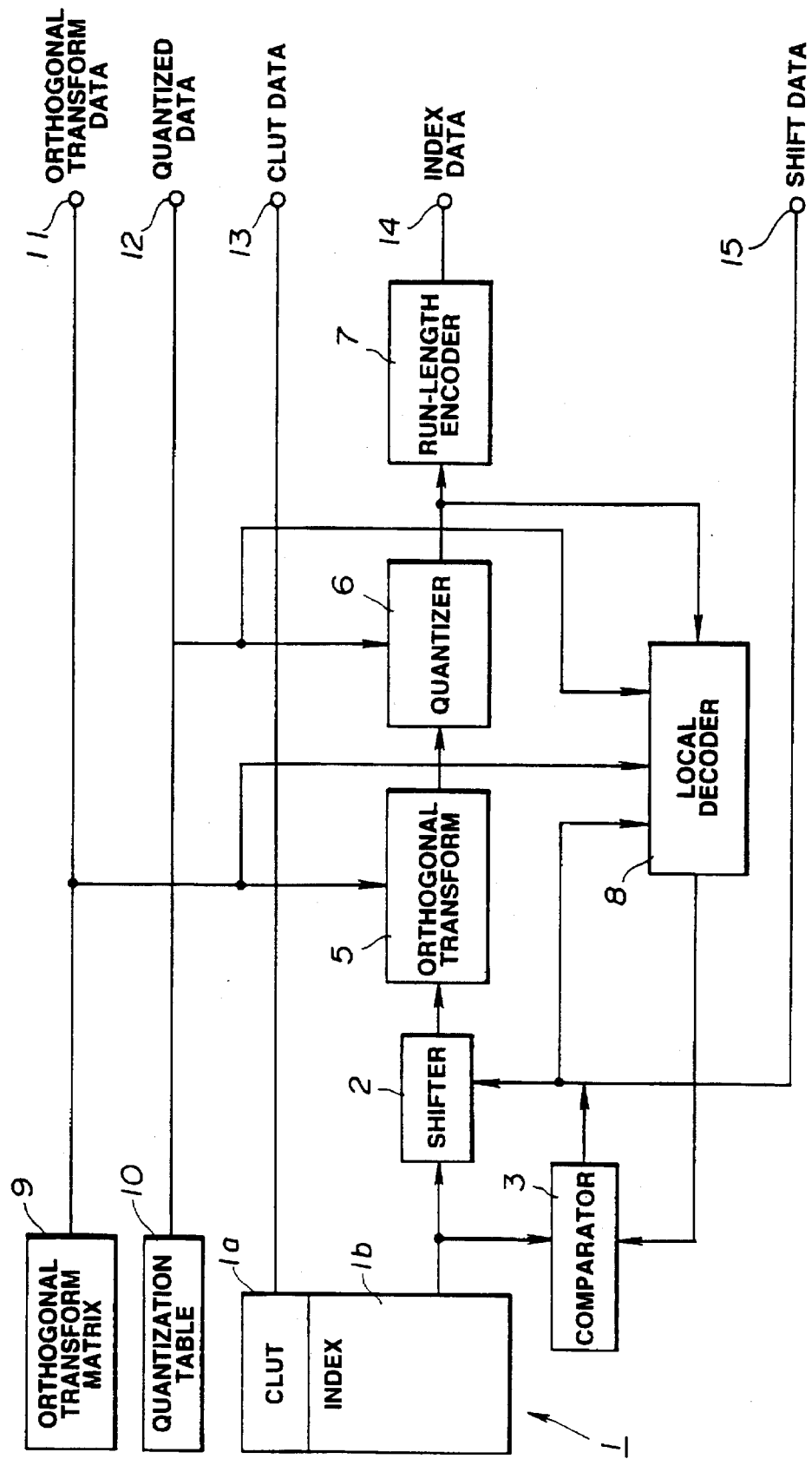
FIG. 2 is a block diagram of a picture compression apparatus according to the present invention.

FIG. 2 shows a picture compression apparatus including CLUT 1, shifter 2, comparator 3, orthogonal transform circuit 5, quantizer 6, run length encoder 7, local decoder 8, orthogonal transform data memory 9, quantization data memory 10, and output terminals 11, 12, 13, 14 and 15.

The color lookup table (CLUT) 1 comprises pseudo-color data memory 1a storing 256 gradations of color data (pseudo color data) for each of R, G and B colors, and index memory 1b storing index data indicating addresses for the pseudo color data stored in the pseudo color data memory 1a.

At the start of compression, the pseudo-color data memory 1a is operative to supply pseudo-color data for splite patterns to output terminal 13, for transmission to, for example, a CD-ROM.

The index memory 1b is operative to supply an 8×8 array of index data words representing pixels of a splite pattern to bit shifter 2 and comparator 3.

The comparator 3 functions to initially apply a shift data control signal to bit shifter 2 indicating that no bit shifting is to be performed, and to store the original index data from the memory 1b. The comparator 3 further functions to respectively compare the words of the stored original index data with decoded data words supplied thereto from local decoder 8, and to subsequently modify the control signal to bit shifter 2 as a function of the comparison of the original index data and the decoded data. The comparator 3 also supplies the shift data control signal to the local decoder 8 and an output terminal 15.

The bit shifter 2 functions to shift each word of the index data array supplied thereto by an amount determined by the control signal from comparator 3. In the initial iteration of the compression apparatus shown in FIG. 2, the control signal indicates no bit shifting so the shifter 2 simply passes the array of index data to orthogonal transform circuit 5. In a subsequent iteration, the control signal may indicate, for example, that a shift of two bits should occur, so the shifter 2 shifts the word to the left by two bits. For example, the shifter 2 will shift a value of "1000 1111" to "1000 1111 00" in response to a "shift 2 bits" control signal.

The index data array may comprise words of length, for example, 8 bits, and the shifted index data array A may comprise words of length, for example, 16 bits.

The array A of index data, as selectively shifted by the bit shifter 2, is supplied to the orthogonal transform circuit 5.

Orthogonal transform data memory 9 is adapted to store a matrix U of orthogonal transform data, as shown in FIG. 3, and to supply this matrix to the orthogonal transform circuit 5 and the local decoder 8.

The orthogonal transform circuit 5 functions to orthogonally transform the selectively shifted array A of index data in accordance with the orthogonal transform matrix U, and to supply the resulting matrix B of transform coefficients to quantizer 6. For example, the circuit 5 may operate according to the following equation:

$$B = Ut \times A \times U$$

where Ut is defined so that I=U×Ut, with I being the identity matrix having values of one along the diagonal from top left to bottom right and values of zero elsewhere.

The orthogonal transform circuit 5 may employ a discrete cosine transformation (DCT), Hadamard transformation, discrete sine transformation, Karhunen-Loeve transformation, a slant transformation, or other orthogonal transformation, as will be appreciated by one of ordinary skill in the art.

Quantization table memory 10 is adapted to store a table of quantization steps for the respective values of the transform coefficient matrix, as shown in FIG. 4, and to supply this table to the quantizer 6 and to the local decoder 8. The quantization table represents different degrees of quantization, depending on the position of a coefficient in the coefficient matrix.

The quantizer 6 functions to quantize the transform coefficient matrix in accordance with the respective elements of the quantization table, and to supply the quantized data to local decoder 8. After the iterations of the apparatus of FIG. 2 have completed, the quantizer 6 also functions to supply the quantized data to run-length encoder 7.

The orthogonal transform data and the quantized data, used for quantizing an animation picture, differ from those used for quantizing a natural picture. Orthogonal transform data and quantized data are known for which almost all of the quantization coefficient data may be empirically set to zero. The quantization table may be employed depending on whether the picture to be quantized is an animation picture or a natural picture. The orthogonal transform data and the quantization table shown in FIGS. 3 and 4 are designed so that almost all of the index data of the splite pattern of an animation picture are set to zero.

The local decoder 8 functions to decode, that is, dequantize, inverse orthogonally transform and inverse bit shift, the quantized data supplied thereto from the quantizer 6 in accordance with the quantization table from the memory 10, the orthogonal transform matrix from the memory 9, and the shift data from the bit shifter 2 to produce decoded data, as described in detail below with reference to FIG. 5, and to supply the decoded data to the comparator 3.

In each iteration, the compression apparatus shown in FIG. 2 reads out, bit shifts, orthogonally transforms, quantizes and locally decodes an array of index data, and compares the decoded index data with the original index data. The compression apparatus iterates, increasing the amount of bit shifting at each iteration, until the comparison indicates that the decoded index data matches the original index data, that is, each word of the original index data is accurately reproduced in the decoded data. A match occurs when reversible data compression is possible, namely, the value of corresponding words of the original and decoded index data are the same.

When the comparison performed by the comparator 3 indicates that the original index data matches the decoded index data, the quantizer 6 supplies the corresponding quantized coefficient data to the run-length encoder 7.

The run-length encoder 7 is adapted to variable length encode a predetermined amount of reversibly compressed quantized data, for example, an amount corresponding to a splite pattern, to form encoded index data which is of the same length for each predetermined amount, and to output the encoded index data to an output terminal 14 for further processing, such as recording on a CD-ROM recording medium.

In the present invention, since the index data is recorded after verifying during compression that reversible reproduction is feasible, the picture displayed on the television receiver corresponds to the picture data of the original splite pattern, thereby avoiding the problem of a difference in color hues between the original picture and the displayed picture after compression, recording and de-compression.

The number of pixels in a splite pattern is not a crucial feature of the present invention. Similarly, the size of the color lookup table is not a crucial feature of the present invention.

Picture data other than splite pattern index data indexing a color lookup table may be compressed by the present invention, as long as the picture data are supplied as blocks comprising a predetermined number of pixels.

The local decoder 8 will now be explained.

Figure 5:
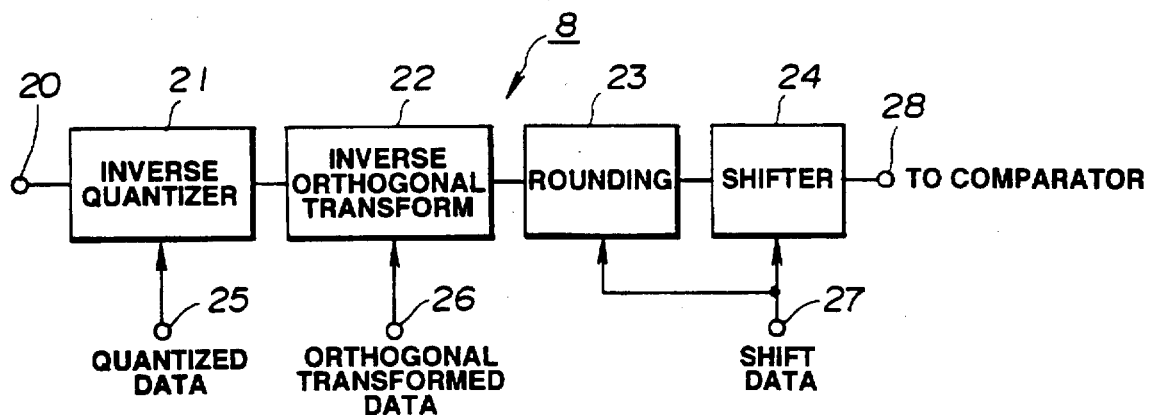
FIG. 5 is a block diagram showing a local decoder of the picture compression apparatus shown in FIG. 2.

FIG. 5 shows a circuit construction for the local decoder 8, including input terminals 20, 25, 26, 27, dequantizer 21, inverse orthogonal transform circuit 22, rounding circuit 23, shifter 24 and output terminal 28.

Quantized coefficient data are supplied to input terminal 20, which functions to supply the quantized coefficient data to dequantizer 21.

The quantization table stored in quantization table memory 10 is applied to input terminal 25, which supplies the quantization table to dequantizer 21.

The dequantizer 21 is adapted to dequantize the quantization coefficient data using the quantized table to form transform coefficients, and to supply the coefficient data matrix B to inverse orthogonal transform circuit 22.

The orthogonal transform matrix U stored in orthogonal transform memory 9 is applied to input terminal 26, which supplies the orthogonal transform matrix to inverse orthogonal transform circuit 22.

The inverse orthogonal transform circuit 22 is adapted to inverse orthogonal transform the transform coefficient matrix B based upon the orthogonal transform matrix U to generate an index data matrix A', and to supply the index data to rounding circuit 23. For example, the circuit 22 may operate according to the following equation:

$$A' = U \times B \times Ut$$

Since B=Ut×A×U, the following will be appreciated:

$$A' = U \times (Ut \times A \times U) \times Ut$$
$$= (U \times Ut) \times A \times (U \times Ut)$$
$$= I \times A \times I$$
$$= A$$

The shift data from bit shifter 2 is applied to input terminal 27, which supplies the shift data to rounding circuit 23 and shifter 24.

The rounding circuit 23 is adapted to add a value determined by the shift data to the index data from inverse orthogonal transform circuit 22 to form rounded index data, and to supply the rounded index data to shifter 24. For example, if the shift data indicates a two bit shift to the right, then the value "0000 0010" will be added by the rounding circuit 23. Rounding of index data by the rounding circuit 23 allows a reduction in the amount of bit shifting by the bit shifter 2.

The shifter 24 is adapted to inverse shift the rounded index data based on the shift data to form decoded index data. For example, if the rounded index data is "1000 1111 00" and the shift data indicates a shift of two bits, shifter 24 forms decoded index data "1000 1111". The shifter also supplies the decoded index data to an output terminal 28, which supplies the decoded index data to comparator 3 of FIG. 2.

A picture reproducing (decompression) apparatus according to a preferred embodiment of the present invention will now be explained.

Figure 6:
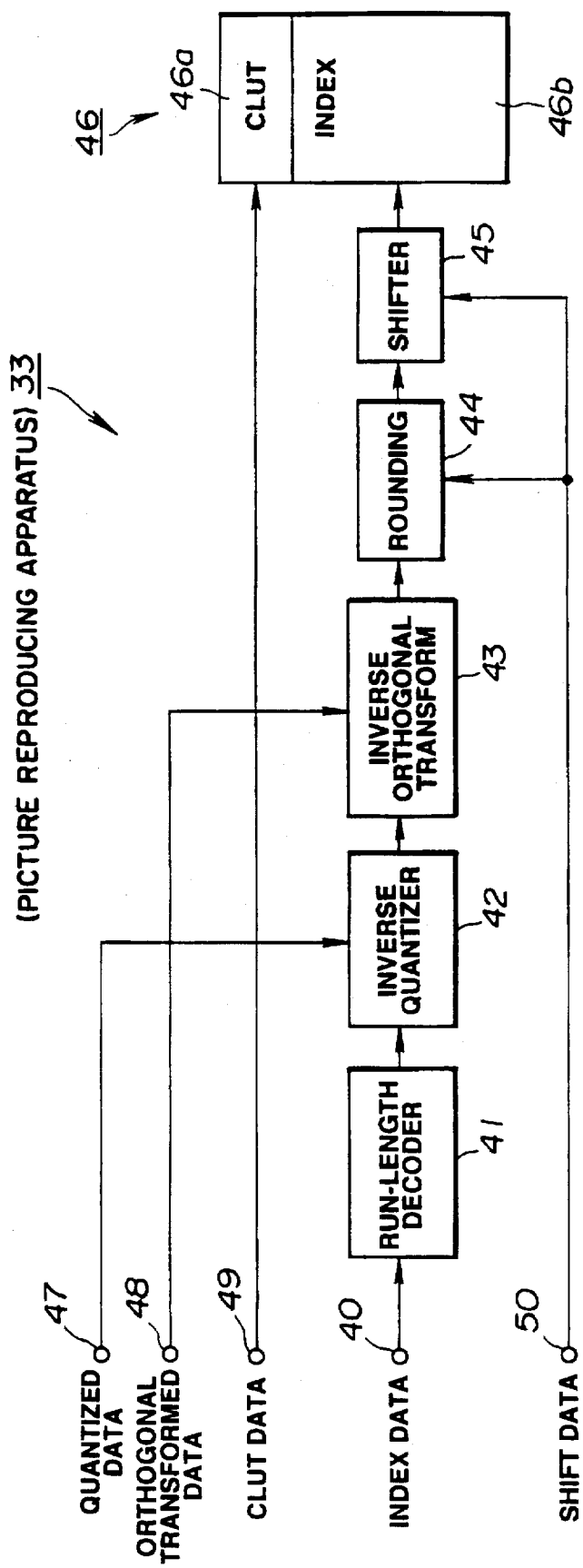
FIG. 6 is a block diagram showing a picture reproducing apparatus according to the present invention.

FIG. 6 shows a picture reproducing apparatus 33 including input terminals 40, 47, 48, 49, 50, run-length decoder 41, inverse quantizer 42, inverse orthogonal transform circuit 43, rounding circuit 44, shifter 45, and memory 46 including pseudo color data memory 46a and index data memory 46b.

At the start of reproducing compressed picture data from a CD-ROM, quantized data, orthogonal transform data, pseudo color data, index data and shift data are read from the CD-ROM and supplied to input terminals 47, 48, 49, 40 and 50, respectively, which are adapted to supply the reproduced data to dequantizer 42, inverse orthogonal transform unit 43, pseudo color data memory 46a, run-length decoder 41 and shifter 45, respectively.

The run-length decoder 41 is adapted to variable length decode the variable length encoded quantized coefficient data, and to supply the decoded data to dequantizer 42.

Dequantizer 42, inverse orthogonal transform circuit 43, rounding circuit 44, shifter 45 function in generally the same manner as the corresponding elements of the local decoder 8 of FIG. 5, and will not be described here for brevity. The shifter 45 functions to supply inverse-shifted data to index data memory 46b.

Picture data is read out from the CLUT 46 for supply to, for example, a television receiver. Specifically, the index data representing each pixel of the splite pattern is used as an address to read, for example, R, G, B color data from the pseudo color data memory 46a as the picture data for the pixel.

In the present invention, because the expansion of the reproduced data is achieved by hardware such as shown in FIG. 6, the expansion may be quickly performed. Furthermore, data expansion according to the present invention reduces the constraints on the software algorithms used for compression and expansion of the index data.

A picture drawing apparatus according to a preferred embodiment of the present invention will now be explained.

In a picture drawing apparatus according to the present invention, a picture is drawn by reproducing and decompressing input index picture data of a splite pattern of a pre-set rectangular area which has been compressed in accordance with the present invention, and converting the index picture data using a color lookup table to data for display on a television screen.

Figure 7:
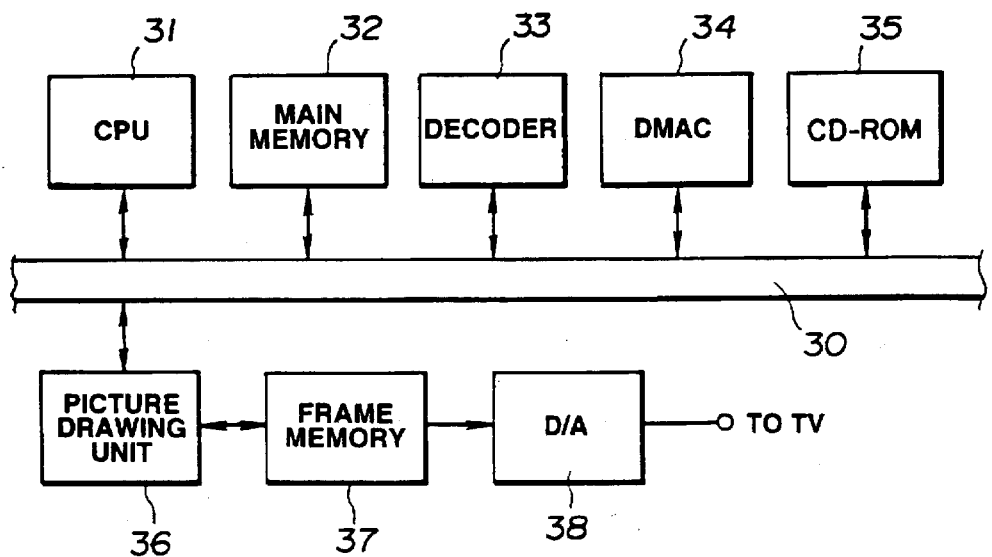
FIG. 7 is a block diagram showing a picture drawing apparatus according to the present invention.

FIG. 7 shows a picture drawing apparatus including bus 30, central processing unit (CPU) 31, main memory 32, decoder 33, direct memory access controller (DMAC) 34, reproducing system 35, picture drawing circuit 36, frame memory 37 and digital to analog (D/A) converter 38.

The CPU 31 is adapted to control the operation of the overall picture drawing apparatus.

At the start of a picture drawing operation, the CPU 31 functions to control the reproducing system 35 to reproduce data stored on a CD-ROM, and to supply the reproduced data to the main memory 32. The data stored on the CD-ROM may be, for example, compressed index data for splite patterns and associated quantization table data, orthogonal transformation matrix data and shift data produced as described above.

The DMAC 34 is operative to control writing of the reproduced data from the reproducing system 35 to the main memory 32. The DMAC executes the data transfer time-divisionally, that is during the time the CPU 31 is not accessed over the bus 30.

The decoder 33 includes a buffer memory. When there is a vacancy in the buffer memory, the decoder 33 is operative to issue a read-in data request to the DMAC 34.

The DMAC 34 responds to the read-in data request from the decoder 33 by controlling read out of the data reproduced from the CD-ROM and stored in the main memory 32 and writing of the reproduced data to the decoder 33.

The decoder 33 also includes, for example, the picture reproducing apparatus shown in FIG. 6, and functions to form picture data from the reproduced data supplied thereto from the main memory 32, and to temporarily write the picture data in its buffer memory. When the buffer memory is filled, the decoder 33 is operative to issue a read-out data request to the DMAC 34.

The DMAC 34 responds to the read-out data requested from the decoder 33 by controlling read out of the picture data from the buffer memory of the decoder 33 and writing of the read-out picture data to the main memory 33.

The picture drawing circuit 36 is operative to issue a read-in picture data request to the DMAC 34.

The DMAC 34 responds to the read-in picture data request from the picture drawing circuit 36 by controlling read out of the picture data stored in the main memory 32 and writing of the picture data to the circuit 36.

The picture drawing circuit functions to form the picture data from the main memory 32 into a frame of picture data and to supply the frame of picture data to frame memory 37.

The frame memory 37 is adapted to temporarily store at least one frame of picture data from the picture drawing circuit 36, and to supply the frame to D/A converter 38 which functions to convert the frame of picture data into analog signals and to output the analog signals to a television receiver.

Thus a picture corresponding to the compressed index data reproduced from the CD-ROM may be displayed on the television receiver.

Since the bus 30 is used for time-divisional data transfer by the DMAC 34, the above described reproduction and display operations can occur generally without intervention by the CPU 31. Thus, the processing load on the CPU 31 is reduced.

Since picture data is written in or read out from the memory using the DMAC so as to be supplied to the picture drawing means, the picture corresponding to the picture data may be drawn without involvement by the CPU, so that it is possible to eliminate a large capacity memory, such as video RAM, for storing the picture data from the memory means.

In the reproducing and display operations according to the present invention, a large capacity memory, such as a video RAM, for storing picture data from the main memory 32 is not required. Therefore, a large number of splite patterns may be used to form a picture, resulting in a more variegated picture. Additionally, the software compression and expansion algorithms are not constrained by memory size.

In the reproducing and display operations according to the present invention, the data recorded on the CD-ROM is compressed so as to enable reversible reproduction, as described above. Consequently, the displayed picture matches the original picture, that is, differences in color hue between the original picture and the displayed picture are eliminated.

With the picture drawing apparatus according to the present invention, it is possible to draw on a display screen a picture that is fully coincident with the pre-compression input picture data despite the fact that the picture data is compressed and reproduced using the color lookup table.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. An apparatus for compressing digital image data representing at least one picture image, said apparatus comprising:

means for supplying uncompressed digital image data having a plurality of bits;

transform means for orthogonally transforming said uncompressed digital image data so as to produce coefficient data;

quantizing means for quantizing said coefficient data so as to produce quantized data;

decompressing means for decompressing said quantized data in accordance with a control signal so as to produce decompressed image data, said decompressing means including means for processing said quantized data, rounding means for adding a value based on said control signal to the processed quantized data to produce rounded data and inverse shifting means for inverse shifting said rounded data in accordance with said control signal to produce said decompressed image data;

comparison means for comparing said uncompressed digital image data with said decompressed image data so as to detect any discrepancies therebetween and for producing said control signal corresponding thereto;

shifting means for shifting said uncompressed digital image data by a number of bits in accordance with said control signal so as to produce shifted image data; and encoding means for encoding the quantized data;

said apparatus being operative such that: (i) during a first iteration, if said comparison means indicates an absence of said discrepancies then said encoding means encodes the quantized data corresponding to said uncompressed digital image data and if said comparison means detects a discrepancy then said encoding means does not encode the quantized data corresponding to said uncompressed digital image data and said shifting means bit shifts said uncompressed digital image data in accordance with said control signal and supplies the produced shifted image data to said transform means, and (ii) during a second and any subsequent iterations, the shifted image data is pressed through said transform means, said quantizing means, said decompressing means and said comparison means so as to detect any discrepancies between the shifted image data and said uncompressed digital image data, whereupon if said comparison means indicates an absence of said discrepancies then said encoding means encodes the quantized data corresponding to the current shifted image data and if said comparison means detects a discrepancy then said encoding means does not encode the quantized data corresponding to the current shifted image data and said shifting means again shifts said uncompressed digital image data in accordance with the latest control signal.

2. The apparatus of claim 1, wherein the processing means of said decompressing means includes dequantizer means for dequantizing said quantized data to produce recovered coefficient data and inverse transform means for inverse orthogonally transforming said recovered coefficient data to produce recovered shifted data, and wherein said rounding means adds said value to said recovered shifted data in accordance with said control signal to produce said rounded data.

3. The apparatus of claim 1, wherein said transform means is operative to orthogonally transform said shifted uncompressed digital image data as a function of an orthogonal transform matrix, and said decompressing means is operative to decompress said quantized data as a function of said orthogonal transform matrix.

4. The apparatus of claim 1, wherein said encoding means performs variable length coding on said quantized data to produce compressed image picture data.

5. The apparatus of claim 1, wherein said uncompressed digital image data represents a splite pattern.

6. An apparatus for reproducing data obtained from a compressing device in which uncompressed digital image data having a plurality of bits is orthogonally transformed to produce coefficient data, said coefficient data is quantized to produce quantized data, said quantized data is decompressed to produce decompressed image data, said uncompressed digital image data is compared with said decompressed image data so as to detect any discrepancies therebetween and a control signal corresponding thereto is produced, said uncompressed digital image data is shifted by a number of bits in accordance with said control signal to produce shifted image data, and the quantized data is encoded, said compressing device being operative such that: (i) during a first iteration, if the comparison indicates an absence of said discrepancies then the quantized data corresponding to said uncompressed digital image data is encoded and if said comparison indicates a discrepancy then the quantized data corresponding to said uncompressed digital image data is not encoded and said uncompressed digital image data is bit shifted in accordance with said control signal, and (ii) during a second and any subsequent iterations, the shifted image data is orthogonally transformed, quantized, decompressed and compared so as to detect any discrepancies between the shifted image data and said uncompressed digital image data, whereupon if the comparison indicates an absence of said discrepancies then the quantized data corresponding to the current shifted image data is encoded and if said comparison detects a discrepancy then the quantized data corresponding to the current shifted image data is not encoded and said uncompressed digital image data is again shifted in accordance with the latest control signal, said apparatus comprising:

dequantizer means for dequantizing the quantized data to produce recovered coefficient data;

inverse transform means for inverse orthogonally transforming said recovered coefficient data to produce recovered shifted image data; and inverse shifting means for inverse shifting said recovered shifted image data in accordance with the number of bits shifted in said uncompressed digital image data as a function of the control signal to produce recovered decompressed image picture data.

7. The apparatus of claim 6, further comprising rounding means for adding a value based on said control signal to said recovered shifted image data to produce rounded data, and wherein said inverse shifting means is operative to inverse shift said rounded data to produce said recovered decompressed image picture data.

8. The apparatus of claim 6, further comprising decoder means for variable length decoding the encoded image data to produce said quantized data.

9. The apparatus of claim 6, wherein said recovered decompressed image picture data represents a splite pattern.

10. The apparatus of claim 9, wherein said recovered decompressed image picture data includes index data, and further comprising a memory for storing color data at respective addresses and for reading out the color data stored at addresses indicated by said index data.

11. A picture drawing apparatus for forming picture data from recorded data which is compressed by a compressing device wherein uncompressed digital image data having a plurality of bits is orthogonally transformed to produce coefficient data, said coefficient data is quantized to produce quantized data, said quantized data is decompressed to produce decompressed image data, said uncompressed digital image data is compared with said decompressed image data so as to detect any discrepancies therebetween and a control signal corresponding thereto is produced, said uncompressed digital image data is shifted by a number of bits in accordance with said control signal to produce shifted image data, and the quantized data is encoded, said compressing device being operative such that: (i) during a first iteration, if the comparison indicates an absence of said discrepancies then the quantized data corresponding to said uncompressed digital image data is encoded and if said comparison indicates a discrepancy then the quantized data corresponding to said uncompressed digital image data is not encoded and said uncompressed digital image data is bit shifted in accordance with said control signal, and (ii) during a second and any subsequent iterations, the shifted image data is orthogonally transformed, quantized, decompressed and compared so as to detect any discrepancies between the shifted image data and said uncompressed digital image data, whereupon if the comparison indicates an absence of said discrepancies then the quantized data corresponding to the current shifted image data is encoded and if said comparison detects a discrepancy then the quantized data corresponding to the current shifted image data is not encoded and said uncompressed digital image data is again shifted in accordance with the latest control signal, said apparatus comprising:

reproducing means for reproducing the recorded encoded image data and shift data from a recording medium;

decoding means including dequantizer means for dequantizing the reproduced encoded image data to produce recovered coefficient data, inverse transform means for inverse orthogonally transforming said recovered coefficient data to produce recovered shifted image data, rounding means for adding a value based on said shift data to said recovered shifted image data to produce rounded data and inverse shifting means for inverse shifting said rounded data as a function of said shift data to produce recovered decompressed image picture data; and drawing means for forming said recovered decompressed image picture data into said picture data for display by display means.

12. The apparatus of claim 11, further comprising memory means for storing the reproduced encoded image data and shift data, and control means for controlling writing of said reproduced encoded image data and shift data from said reproducing means to said memory means and for controlling reading of the stored encoded image data and shift data from said memory means to said decoding means.

13. The apparatus of claim 12, wherein said memory means is also operative to store said recovered decompressed image picture data, and said control means is also operative to control writing of said recovered decompressed image picture data from said decoding means to said memory means and reading of the stored decompressed image picture data from said memory means to said drawing means.

14. The apparatus of claim 11, further comprising memory means for storing the recovered decompressed image picture data, and control means for controlling writing of said recovered decompressed image picture data from said decoding means to said memory means and for controlling reading of the stored decompressed image picture data from said memory means to said drawing means.

15. The apparatus of claim 11, further comprising memory means having a color look-up table for storing color data at respective addresses and an index memory for storing index data representative of the addresses of the color data.

16. The apparatus of claim 15, wherein the stored color data represents a splite pattern.

17. The apparatus of claim 15, wherein said memory means is adapted to store index data words representative of pixel data of a splite pattern.

* * * * *